(12) United States Patent
Mifuchi (10) Patent No.: US 11,420,553 B2
(45) Date of Patent: Aug. 23, 2022

(54) ASSEMBLING STRUCTURE FOR VEHICLE INTERIOR LIGHTING DEVICE

(71) Applicant: TOYOTA JIDOSHA KABUSHIKI KAISHA, Aichi-ken (JP)

(72) Inventor: Tetsuhiro Mifuchi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/548,611

(22) Filed: Dec. 13, 2021

(65) Prior Publication Data

US 2022/0219602 A1 Jul. 14, 2022

(30) Foreign Application Priority Data

Jan. 13, 2021 (JP) .............................. JP2021-003572

(51) Int. Cl.
*B60Q 3/51* (2017.01)

(52) U.S. Cl.
CPC ..................................... *B60Q 3/51* (2017.02)

(58) Field of Classification Search
CPC ....................................................... B60Q 3/51
See application file for complete search history.

(56) References Cited

U.S. PATENT DOCUMENTS

| | | | | |
|---|---|---|---|---|
| 6,729,751 B2* | 5/2004 | Sinzawa | .................. | B60Q 3/51 |
| | | | | 362/546 |
| 8,262,266 B2* | 9/2012 | Ohtsuka | .................. | B60Q 3/51 |
| | | | | 362/490 |
| 8,820,989 B2* | 9/2014 | Suzuki | .................... | B60Q 3/51 |
| | | | | 362/490 |
| 2003/0072166 A1* | 4/2003 | Sinzawa | .................. | B60Q 3/51 |
| | | | | 362/544 |
| 2005/0254250 A1* | 11/2005 | Nagai | ...................... | B60Q 3/51 |
| | | | | 362/490 |
| 2010/0195348 A1 | 8/2010 | Ohtsuka et al. | | |
| 2011/0222306 A1 | 9/2011 | Nagai et al. | | |
| 2011/0235352 A1* | 9/2011 | Suzuki | .................... | B60Q 3/51 |
| | | | | 362/490 |
| 2011/0280027 A1 | 11/2011 | Takasaki | | |
| 2013/0279189 A1 | 10/2013 | Suzuki et al. | | |
| 2014/0104866 A1 | 4/2014 | Maeda et al. | | |

FOREIGN PATENT DOCUMENTS

| | | |
|---|---|---|
| JP | 4454588 B2 | 4/2010 |
| JP | 2010125929 A | 6/2010 |
| JP | 2010143444 A | 7/2010 |

* cited by examiner

*Primary Examiner* — Thomas M Sember
(74) *Attorney, Agent, or Firm* — Hauptman Ham, LLP (57) ABSTRACT

A mounting hole of an interior material includes continuous first and second through portions. The second through portion is wider than the first through portion. An inner periphery of the second through portion includes a pair of connecting portions extending to widen. A first sandwiching portion of a housing of a vehicle interior lighting device includes a first facing portion facing an inner end face of the mounting hole, and sandwiches a first part located across the first through portion from the second through portion in the interior material. A pair of second sandwiching portions of the housing each includes a second facing portion facing an associated one of the pair of connecting portions of the mounting hole. Each of the pair of second sandwiching portions sandwiches a second part located across the pair of connecting portions from the second through portion in the interior material.

3 Claims, 6 Drawing Sheets

ASSEMBLING STRUCTURE FOR VEHICLE INTERIOR LIGHTING DEVICE

CROSS-REFERENCE TO RELATED APPLICATION

This application claims priority to Japanese Patent Application No. 2021-003572 filed on Jan. 13, 2021, incorporated herein by reference in its entirety.

BACKGROUND

1. Technical Field

The disclosure relates to an assembling structure for a vehicle interior lighting device.

2. Description of Related Art

Japanese Unexamined Patent Application Publication No. 2010-125929 (JP 2010-125929 A) describes a technology for an in-vehicle interior lighting device. Briefly, the in-vehicle interior lighting device is, for example, attached to a body and an interior wall material on a ceiling side of a vehicle. The in-vehicle interior lighting device includes body lock arms and wall material lock arms. The body lock arms are engaged with locking parts of the body. The wall material lock arms are engaged with locking holes of the interior wall material. The body lock arms are respectively provided at two diagonal points of a substantially rectangular housing in plan view near the periphery of the housing. The wall material lock arms are provided at other two diagonal points of the housing near the periphery of the housing. With such a structure, the in-vehicle interior lighting device is supported by both the body and the interior wall material.

SUMMARY

Incidentally, with the above existing technology, the in-vehicle interior lighting device is supported by both the body and the interior wall material. When the weight of the interior lighting device is reduced, a structure of supporting the vehicle interior lighting device by only an interior material is possible. In such a structure, for example, a structure in which lock arms are provided near four corners of a housing as in the case of the existing technology and the four lock arms are engaged with locking holes or the like of the interior material is conceivable.

However, when such a structure is employed, an assembling structure is not simplified, so there is room for improvement in terms of this point.

The disclosure provides an assembling structure for a vehicle interior lighting device, which simplifies a structure of assembling a vehicle interior lighting device to an interior material.

A first aspect of the disclosure provides an assembling structure for a vehicle interior lighting device. The assembling structure includes an interior material, a first sandwiching portion, and a pair of second sandwiching portions. The interior material is provided so as to face a vehicle cabin and has a through mounting hole. The mounting hole includes a first through portion and a second through portion continuous with each other. The second through portion is wider than the first through portion. An inner periphery of the second through portion includes a pair of connecting portions extending so as to widen from a pair of inner peripheral ends making up an open end of the first through portion on a side adjacent to the second through portion when viewed in a through direction of the mounting hole. The first sandwiching portion is provided in a housing of the vehicle interior lighting device to be mounted at a peripheral side of the mounting hole in the interior material. The first sandwiching portion includes a first facing portion facing an inner end face opposite from an open side in the first through portion when viewed in the through direction of the mounting hole. The first sandwiching portion sandwiches a first part located across the first through portion from the second through portion in the interior material. The pair of second sandwiching portions is provided in the housing. Each of the pair of second sandwiching portions includes a second facing portion facing an associated one of the pair of connecting portions. Each of the pair of second sandwiching portions sandwiches a second part located across the pair of connecting portions from the second through portion in the interior material.

With the above configuration, the interior material provided so as to face the vehicle cabin has the through mounting hole, the mounting hole includes the first through portion and the second through portion continuous with each other, and the second through portion is wider than the first through portion. The inner periphery of the second through portion includes the pair of connecting portions extending so as to widen from the pair of inner peripheral ends making up the open end of the first through portion on the side adjacent to the second through portion when viewed in the through direction of the mounting hole. The housing of the vehicle interior lighting device is mounted at the peripheral side of the mounting hole in the interior material. The first sandwiching portion provided in the housing includes the first facing portion facing the inner end face opposite from the open side in the first through portion when viewed in the through direction of the mounting hole. The first sandwiching portion sandwiches the first part located across the first through portion from the second through portion in the interior material. Each of the pair of second sandwiching portions provided in the housing include the second facing portion facing an associated one of the pair of connecting portions. Each of the pair of second sandwiching portions sandwiches the second part located across the pair of connecting portions from the second through portion in the interior material. With such a structure, the interior material can be sandwiched by the first sandwiching portion and the pair of second sandwiching portions by sliding the vehicle interior lighting device. The vehicle interior lighting device is able to be assembled to the interior material by using the three sandwiching portions. With such a slide assembling structure, a structure for assembling the vehicle interior lighting device to the interior material is simplified.

In the above configuration, the housing may include a frame portion formed in a frame shape as a component to be disposed adjacent to the vehicle cabin and having an opening extending through in the through direction of the mounting hole. A first part of the frame portion may make up one of component parts of the first sandwiching portion sandwiching the interior material. A second part of the frame portion may make up one of component parts of each of the second sandwiching portions sandwiching the interior material.

With the above configuration, a part of the component parts of the first sandwiching portion and a part of the component parts of each of the second sandwiching portions are made up of the component of the frame portion of the housing, so the structure for assembling the vehicle interior lighting device to the interior material is effectively simplified.

In the above configuration, the vehicle interior lighting device may include a connector housing in which a connector terminal is accommodated, and a support wall provided in the housing and supporting the connector housing. The support wall may make up the other one of the component parts of the first sandwiching portion sandwiching the interior material.

With the above configuration, the first part of the frame portion makes up one of the component parts of the first sandwiching portion sandwiching the interior material, and the support wall that supports the connector housing makes up the other one of the component parts of the first sandwiching portion sandwiching the interior material. In this way, when the support wall that supports the connector housing is also used as the component part of the first sandwiching portion, the structure for assembling the vehicle interior lighting device to the interior material is further effectively simplified.

As described above, with the assembling structure for a vehicle interior lighting device according to the disclosure, the advantageous effect that the structure for assembling the vehicle interior lighting device to the interior material is simplified is obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An assembling structure for a vehicle interior lighting device according to an embodiment of the disclosure will be described with reference to FIG. 1 to FIG. 7D. In the drawings, the arrow FR indicates the front side of a vehicle, the arrow UP indicates the upper side of the vehicle, and the arrow W indicates the width direction of the vehicle.

Configuration of Embodiment

Figure 1:
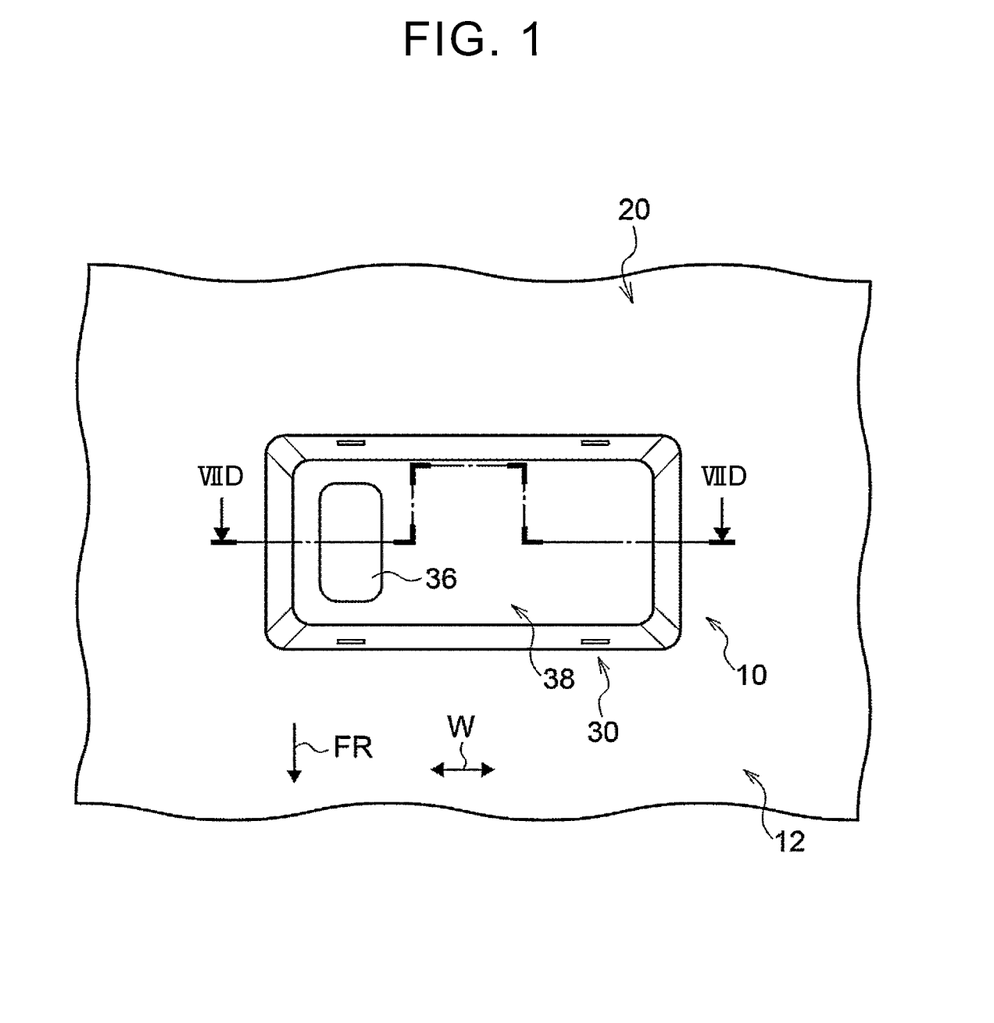
FIG. 1 is a bottom view showing a state where part of a vehicle ceiling portion to which an assembling structure for a vehicle interior lighting device according to an embodiment of the disclosure is applied is viewed from a vehicle cabin side.
Figure 2:
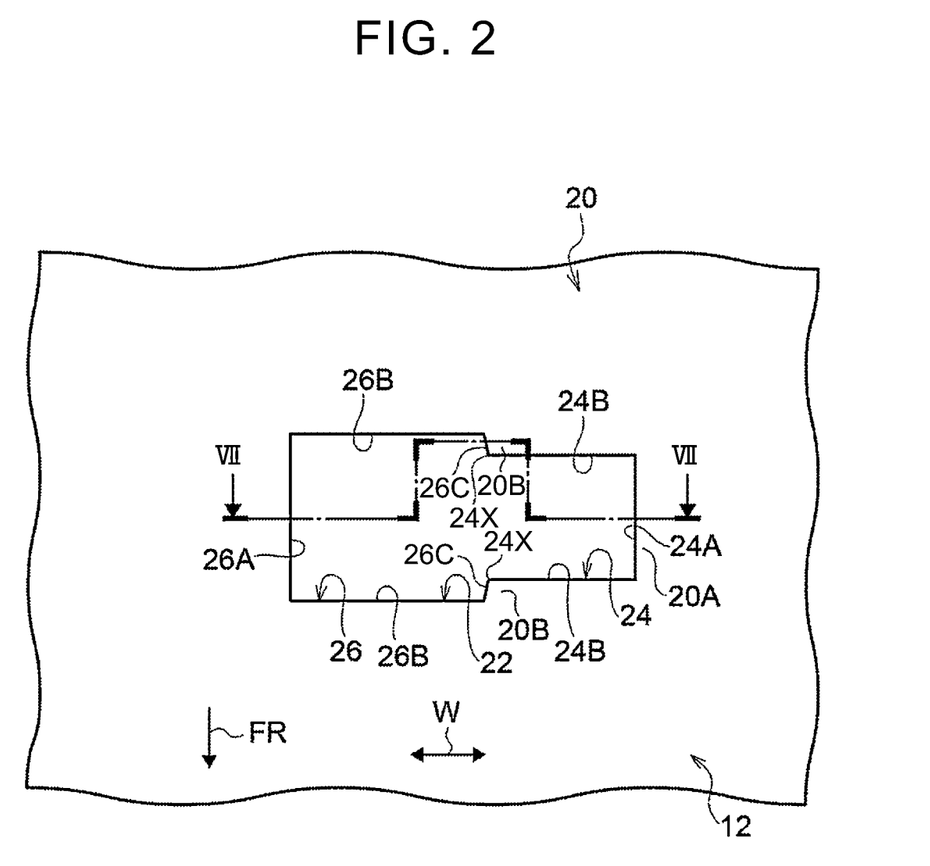
FIG. 2 is a bottom view showing part of the vehicle ceiling portion in a state before the vehicle interior lighting device of FIG. 1 is assembled when viewed from the vehicle cabin side.

FIG. 1 is a bottom view of a state where part of a vehicle ceiling portion 12 to which an assembling structure 10 for a vehicle interior lighting device according to the embodiment is applied is viewed from a vehicle cabin side. A vehicle interior lighting device 30 shown in FIG. 1 is, for example, applied as a room lamp. FIG. 2 is a bottom view of part of the vehicle ceiling portion 12 in a state before the vehicle interior lighting device 30 (see FIG. 1) is assembled when viewed from the vehicle cabin side. An interior ceiling material 20 that is an interior material shown in the drawings is a panel-shaped member made of synthetic resin and is provided so as to face the vehicle cabin.

As shown in FIG. 2, the interior ceiling material 20 has a through mounting hole 22 for mounting the vehicle interior lighting device 30 (see FIG. 1). The mounting hole 22 is, for example, a long hole having a longitudinal direction in the width direction of the vehicle. The mounting hole 22 includes a first through portion 24 and a second through portion 26 continuous with each other. The second through portion 26 is wider than the first through portion 24. When viewed in the through direction of the mounting hole 22, the first through portion 24 is open at one side (left side in the drawing), and the second through portion 26 is formed continuously on the open side of the first through portion 24 and is wider than the first through portion 24.

The first through portion 24 is a rectangular through portion. The inner periphery of the first through portion 24 includes a right inner end face 24A and a pair of first opposite end faces 24B. The right inner end face 24A is an inner end face opposite from the open side in the first through portion 24 when viewed in the through direction of the mounting hole 22. The pair of first opposite end faces 24B extends in the longitudinal direction of the mounting hole 22 from both ends of the right inner end face 24A when viewed in the through direction of the mounting hole 22.

The inner periphery of the second through portion 26 includes a left inner end face 26A and a pair of second opposite end faces 26B. The left inner end face 26A is an inner end face opposite from the first through portion 24 side when viewed in the through direction of the mounting hole 22. The pair of second opposite end faces 26B extends in the longitudinal direction of the mounting hole 22 from both ends of the left inner end face 26A when viewed in the through direction of the mounting hole 22. The left inner end face 26A of the second through portion 26 is disposed parallel to the right inner end face 24A of the first through portion 24. The inner periphery of the second through portion 26 includes a pair of connecting portions 26C extending from a pair of inner peripheral ends 24X so as to widen. The pair of inner peripheral ends 24X makes up the second through portion 26-side open end of the first through portion 24 when viewed in the through direction of the mounting hole 22. The pair of connecting portions 26C is, for example, slightly inclined toward the left inner end face 26A so as to extend toward mutually opposite sides and is connected to end portions of the pair of second opposite end faces 26B opposite from the left inner end face 26A.

Figure 3:
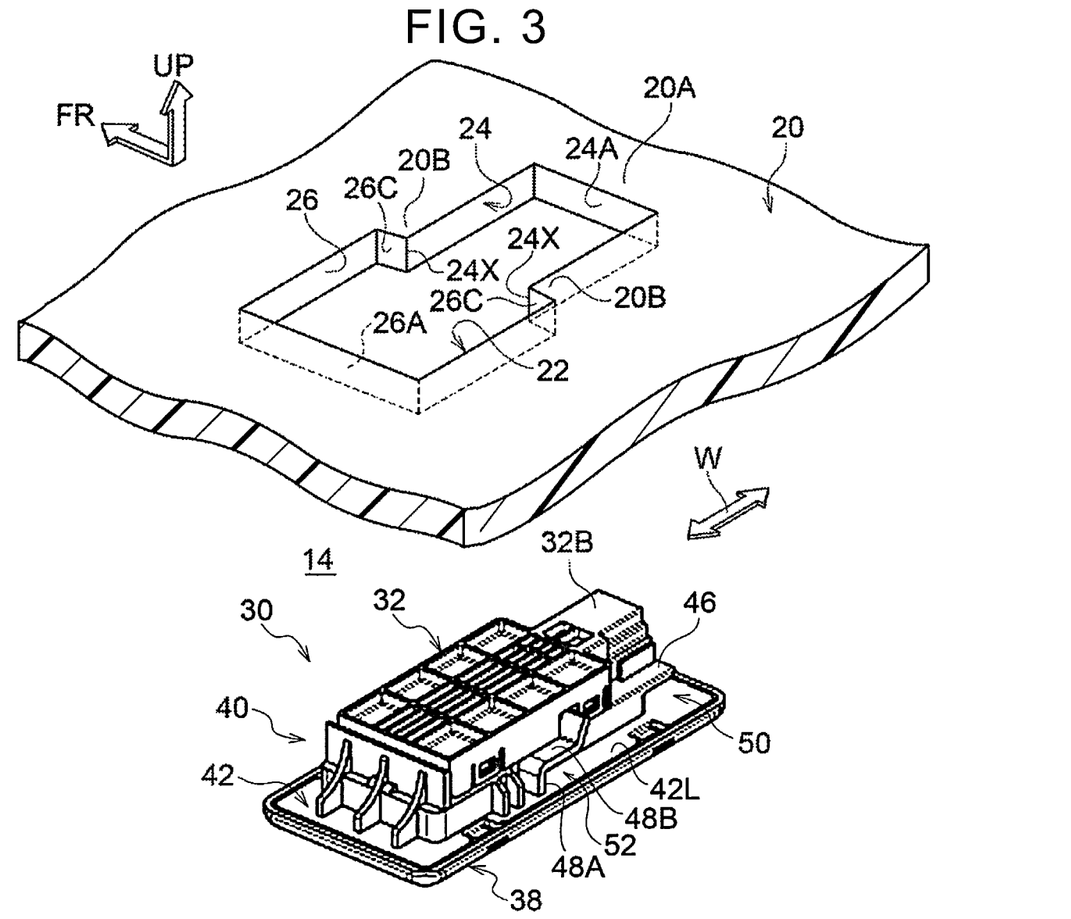
FIG. 3 is a perspective view showing a state where an interior ceiling material and the vehicle interior lighting device shown in FIG. 1 are separated and viewed from diagonally above.
Figure 4:
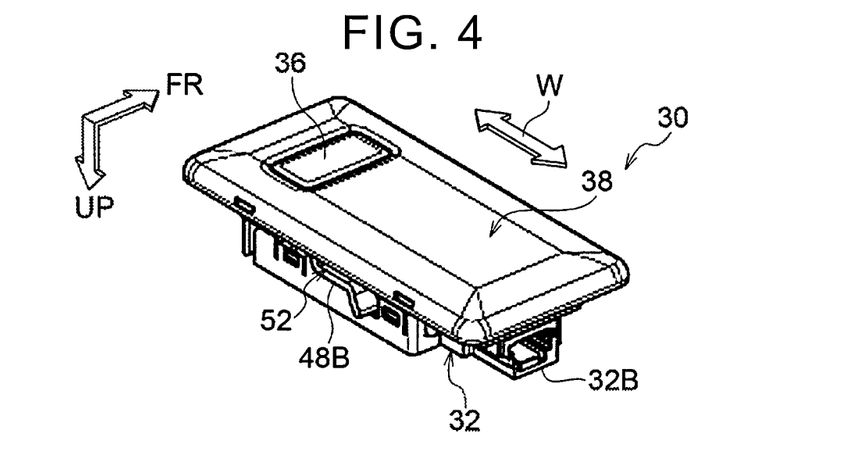
FIG. 4 is a perspective view showing a state where the vehicle interior lighting device shown in FIG. 1 is viewed from diagonally below.
Figure 5:
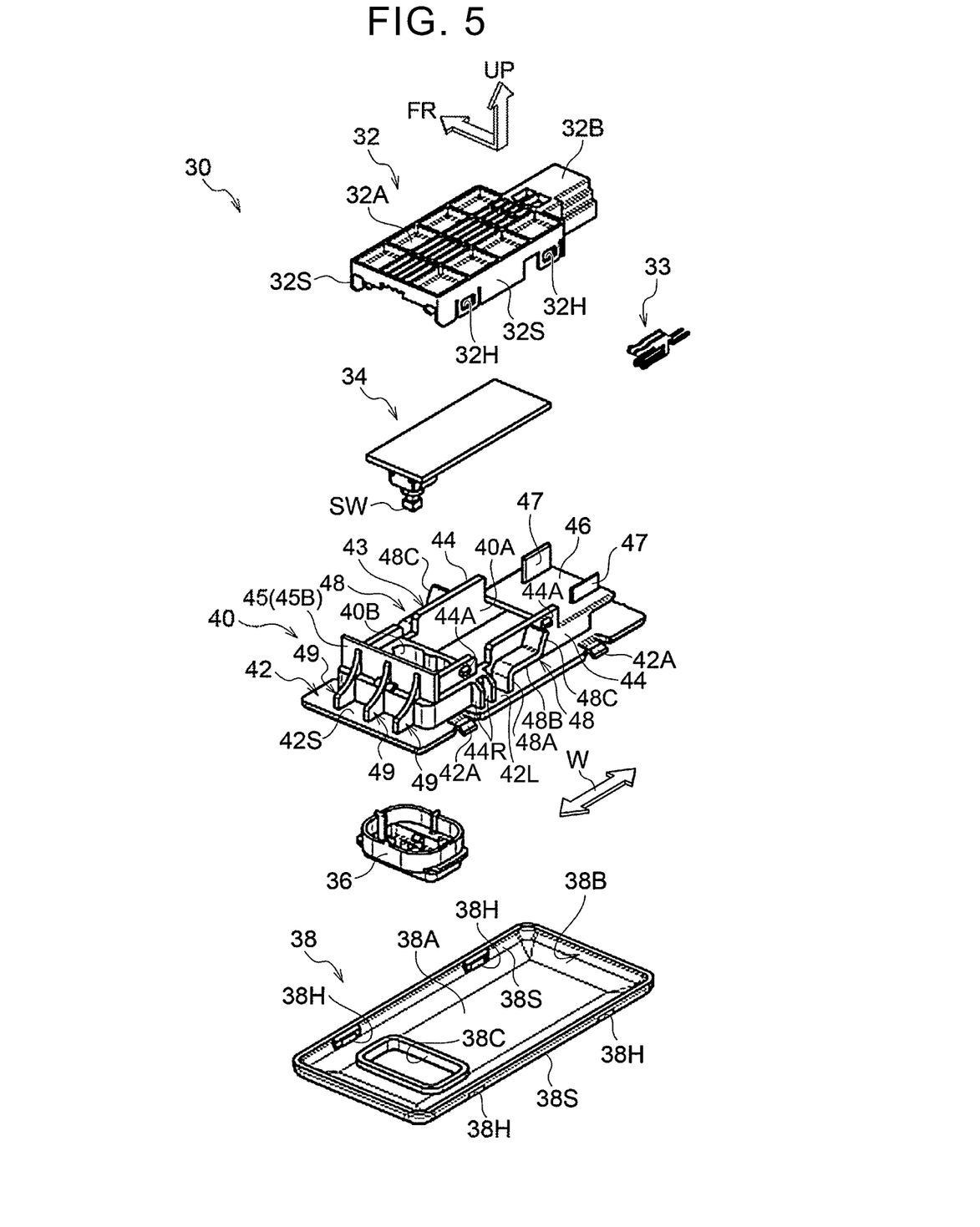
FIG. 5 is an exploded perspective view showing a state where the vehicle interior lighting device shown in FIG. 1 is disassembled and viewed from diagonally above.
Figure 6:
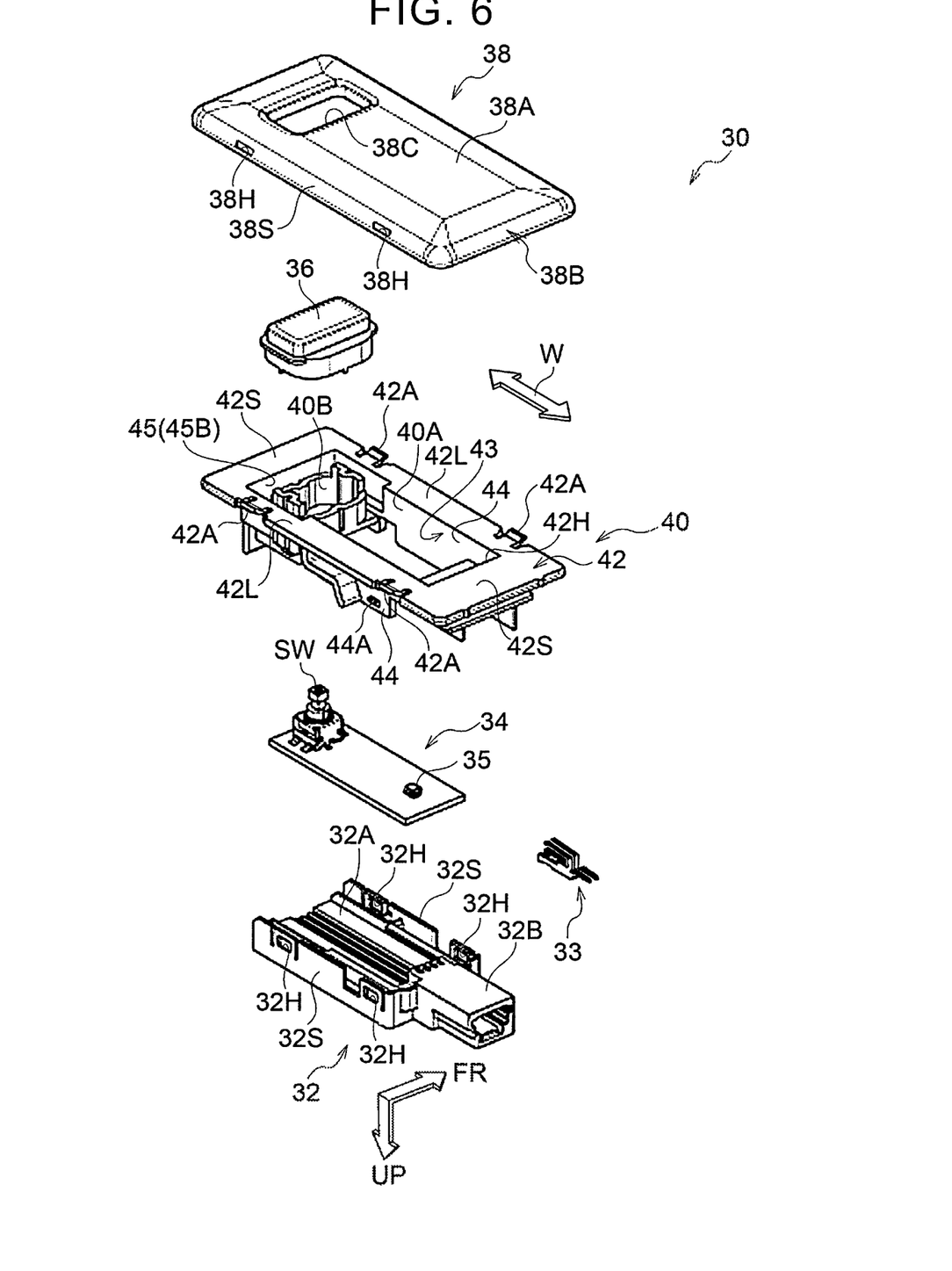
FIG. 6 is an exploded perspective view showing a state where the vehicle interior lighting device shown in FIG. 1 is disassembled and viewed from diagonally below.

FIG. 3 is a perspective view of a state where the interior ceiling material 20 and the vehicle interior lighting device 30 are separated and viewed from diagonally above. The housing 40 of the vehicle interior lighting device 30 is mounted at the peripheral side of the mounting hole 22 in the interior ceiling material 20. FIG. 4 is a perspective view of a state when the vehicle interior lighting device 30 is viewed diagonally below. FIG. 5 is an exploded perspective view of a state when the vehicle interior lighting device 30 is disassembled and viewed from diagonally above. FIG. 6 is an exploded perspective view of a state where the vehicle interior lighting device 30 is disassembled and viewed from diagonally below.

As shown in FIG. 5 and FIG. 6, the vehicle interior lighting device 30 includes a cover 32, a connector terminal 33 (not shown in the drawing other than FIG. 5 or FIG. 6), a substrate 34, a switch knob 36, and a lens 38 in addition to the housing 40.

Figure 7A:
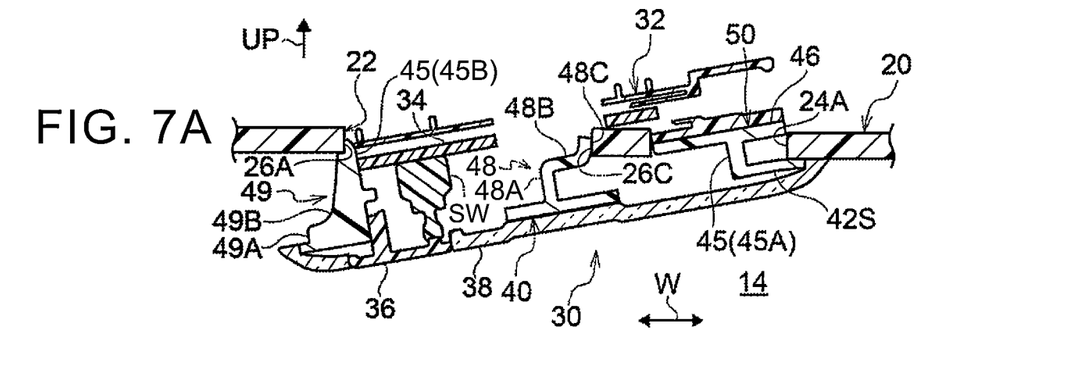
FIG. 7A is a view showing one step of an assembling procedure at the time of assembling the vehicle interior lighting device to the interior ceiling material.
Figure 7B:
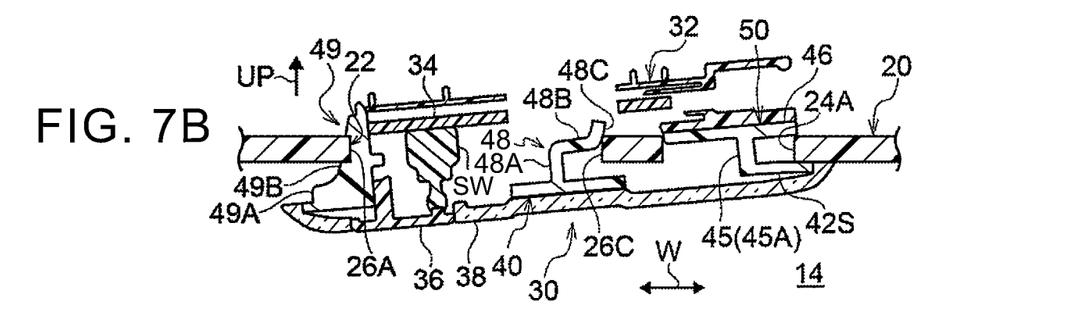
FIG. 7B is a view showing one step of the assembling procedure at the time of assembling the vehicle interior lighting device to the interior ceiling material.
Figure 7C:
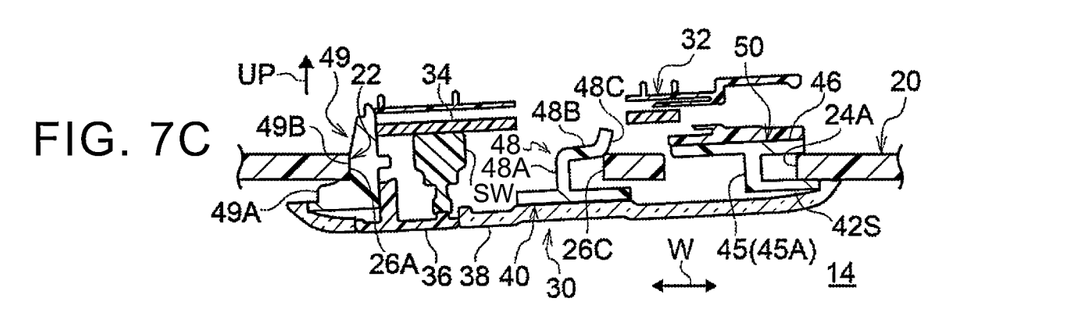
FIG. 7C is a view showing one step of the assembling procedure at the time of assembling the vehicle interior lighting device to the interior ceiling material.
Figure 7D:
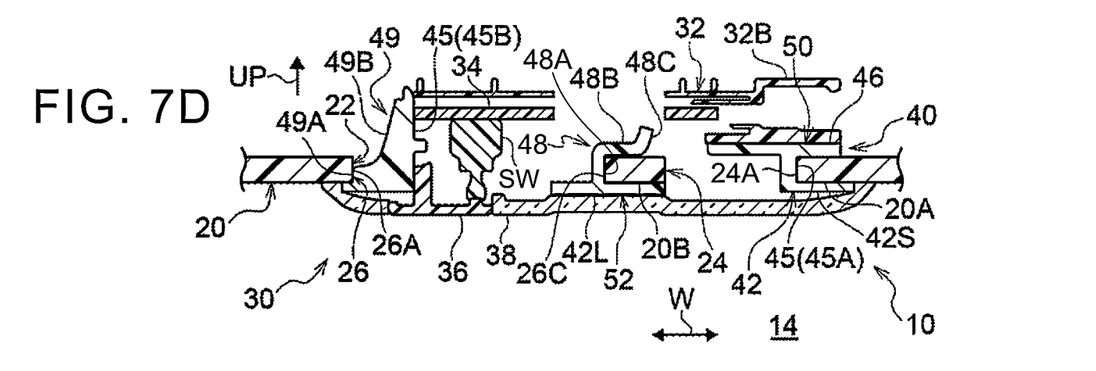
FIG. 7D is a view showing one step of the assembling procedure at the time of assembling the vehicle interior lighting device to the interior ceiling material and is a cross-sectional view taken along the line VIID-VIID in FIG. 1.

Initially, the schematic configuration of the housing 40 will be described. FIG. 7D is a cross-sectional view taken along the line VIID-VIID in FIG. 1. The housing 40 includes a frame portion 42 as a component to be disposed adjacent to the vehicle cabin 14 in a state where the vehicle interior lighting device 30 is assembled to the interior ceiling material 20. As shown in FIG. 6, the frame portion 42 of the housing 40 includes a pair of mutually opposite long side portions 42L and a pair of mutually opposite short side portions 42S. In other words, the frame portion 42 has an opening 42H formed in a rectangular frame shape having a longitudinal direction in bottom view and extending in the through direction of the mounting hole 22 (see FIG. 2). A peripheral wall 43 is upright from the end edge of the opening 42H in the frame portion 42 toward the upper side of the vehicle. The peripheral wall 43 is made up of a pair of mutually opposite long side walls 44 and a pair of mutually opposite short side walls 45 (see FIG. 7D).

As shown in FIG. 7D, a support wall 46 extending in a horizontal direction in an assembled state is integrally formed on the upper end of a first short side wall 45A that is one (the right side one in the drawing) of the pair of short side walls 45. The support wall 46 is provided only on one side (right side in the drawing) in the longitudinal direction of the housing 40 and is also connected to the upper ends of the pair of long side walls 44 shown in FIG. 5. A pair of upright walls 47 opposite each other in a cross direction (a direction perpendicular to the longitudinal direction in plan view) of the housing 40 is provided upright from the upper surface of the support wall 46. As shown in FIG. 7D, a second short side wall 45B that is the other one (the left side one in the drawing) of the pair of short side walls 45 is set such that the amount of projection from the frame portion 42 is greater than that of the first short side wall 45A.

As shown in FIG. 5, the pair of long side walls 44 is set such that a middle portion in the longitudinal direction projects by a larger amount than both end portions in the longitudinal direction. The lower portion of each of the outward surfaces of the second short side wall 45B-side regions of the pair of long side walls 44 is located further outward (toward the outer side of the peripheral wall 43) relative to the upper portion. A plurality of ribs 44R protrudes from the lower portion of each of the outward surfaces. The ribs 44R are set apart from each other in the longitudinal direction of the long side wall 44. The space between the middle portions in the longitudinal direction of the pair of long side walls 44 is designed as a lamp hole 40A that extends through in the up and down direction. The housing 40 has a switch hole 40B that extends through in the up and down direction between the lamp hole 40A and the second short side wall 45B. In the cross-sectional view of FIG. 7D, for the sake of convenience, a component forming the switch hole 40B (see FIG. 5) is not shown.

On the other hand, as shown in FIG. 5, the cover 32 is disposed on a vehicle outer side (in other words, vehicle upper side) of the housing 40. The cover 32 includes a flat cover body 32A having a longitudinal direction and includes a square-tube connector housing 32B on one end of the cover body 32A in the longitudinal direction. The connector housing 32B is disposed on the support wall 46 of the housing 40 between the pair of upright walls 47 and is supported by the support wall 46. The connector terminal 33 is accommodated in the connector housing 32B. Side walls 32S extend from both sides in a direction perpendicular to the longitudinal direction of the cover body 32A toward the housing 40. Each of the side walls 32S has a plurality of engaging holes 32H. Protrusions 44A formed on each of the long side walls 44 of the housing 40 are respectively engaged with the engaging holes 32H.

The substrate 34 is mounted between the housing 40 and the cover body 32A. As shown in FIG. 6, an LED lamp 35 and a switch SW are implemented on the vehicle cabin-side (upper side in the drawing in FIG. 6) surface in the substrate 34. The LED lamp 35 is disposed at a location corresponding to the lamp hole 40A of the housing 40. The switch SW is disposed at a location corresponding to the switch hole 40B of the housing 40. Part of the switch knob 36 is disposed in the switch hole 40B on the vehicle cabin side with respect to the switch SW.

The lens 38 is disposed on the vehicle cabin side with respect to the housing 40. The lens 38 is disposed so as to cover the housing 40. The lens 38 includes a lens body 38A and an outer peripheral wall 38B. The lens body 38A has a flat shape having a longitudinal direction. The outer peripheral wall 38B is provided upright from the outer periphery of the lens body 38A toward the vehicle outer side (in other words, the vehicle upper side (the lower side in the drawing in FIG. 6)). A pair of side walls 38S is respectively provided upright from both sides of the outer peripheral wall 38B in a direction perpendicular to the longitudinal direction of the lens body 38A. Each of the side walls 38S has a plurality of engaging holes 38H. Engaging lugs 42A are respectively provided at each of the long side portions 42L of the frame portion 42 of the housing 40. The engaging lugs 42A are respectively engaged with the engaging holes 38H.

The lens body 38A has a through switch hole 38C at a location corresponding to the switch hole 40B of the housing 40. Part of the switch knob 36 is disposed in the switch hole 38C. In other words, the vehicle interior lighting device 30 is configured to allow the switch SW to be operated via the switch knob 36 from the vehicle cabin side.

Next, components for assembling the vehicle interior lighting device 30 shown in FIG. 3 and other drawings to the interior ceiling material 20 will be described.

As shown in FIG. 7D, the housing 40 of the vehicle interior lighting device 30 includes a first sandwiching portion 50. The first sandwiching portion 50 includes the first short side wall 45A as a first facing portion facing the right inner end face 24A of the mounting hole 22 of the interior ceiling material 20. The first sandwiching portion 50 sandwiches a first part 20A located across the first through portion 24 from the second through portion 26 in the interior ceiling material 20. The first sandwiching portion 50 is made up of part of the short side portion 42S of the frame portion 42, the first short side wall 45A, and part of the support wall 46.

As shown in FIG. 5, a hook 48 projects from each of the long side portions 42L of the frame portion 42 on the side of the middle portion of each of the long side walls 44 of the housing 40 in the longitudinal direction. Each of the hooks 48 is made up of an upright portion 48A and a horizontal portion 48B. The upright portion 48A is upright perpendicularly from the long side portion 42L. The horizontal portion 48B is extended from the distal end of the upright portion 48A so as to be bent at substantially right angles toward the support wall 46 when viewed in the cross direction (in other words, the vehicle front and rear direction) of the housing 40. The hook 48 further includes an inclined portion 48C inclined upward from the distal end of the horizontal portion 48B toward an extension direction of the horizontal portion 48B.

As shown in FIG. 7D, the housing 40 includes second sandwiching portions 52. Each of the second sandwiching portions 52 is made up of part of the hook 48, other than the inclined portion 48C, and part of the long side portion 42L of the frame portion 42. The second sandwiching portions 52 are provided in pairs (not shown). Each of the second sandwiching portions 52 includes the upright portion 48A as a second facing portion facing an associated one of the connecting portions 26C and sandwiches a second part 20B located across the pair of connecting portions 26C of the mounting hole 22 from the second through portion 26 in the interior ceiling material 20.

As shown in FIG. 5, the lower portion of the outward surface of each second short side wall 45B of the housing 40 is located further outward (the side away from the switch hole 40B) relative to the upper portion. The lower portion of the second short side wall 45B is disposed opposite the left inner end face 26A of the mounting hole 22 (see FIG. 3) with a gap. A plurality of ribs 49 projects from the second short side wall 45B toward the side opposite from the switch hole 40B. The ribs 49 are set with a gap in the extension direction of the short side portion 42S (in other words, the cross direction of the mounting hole 22 (see FIG. 2)).

As shown in FIG. 7D, each of the ribs 49 includes a contact portion 49A that contacts with the left inner end face 26A of the mounting hole 22. Each of the ribs 49 includes a curved portion 49B of which the amount of projection reduces in a concave curve shape toward the upper side in a portion above (vehicle outer side) the contact portion 49A.

Next, an assembling procedure at the time of assembling the vehicle interior lighting device 30 to the interior ceiling material 20 will be described with reference to FIG. 7A to FIG. 7D. FIG. 7A to FIG. 7C show a state where the vehicle interior lighting device 30 is displaced in order of FIG. 7A, FIG. 7B, and FIG. 7C in process of assembling the vehicle interior lighting device 30 to the interior ceiling material 20 from the vehicle cabin 14 side. The interior ceiling material 20 shown in FIG. 7A to FIG. 7D corresponds to a cross section taken along the line VIID-VIID in FIG. 2. FIG. 7A to FIG. 7C are sectional views of the vehicle interior lighting device 30, similar to the cross-sectional view of the vehicle interior lighting device 30 shown in FIG. 7D.

Initially, as shown in FIG. 7A, an assembling worker inclines the vehicle interior lighting device 30 such that the right side of the vehicle interior lighting device 30 is slightly higher than the left side on the vehicle cabin 14 side and orients the open end of the first sandwiching portion 50 toward the right inner end face 24A of the mounting hole 22. At this time, the lower distal end of the first sandwiching portion 50 of the vehicle interior lighting device 30 is brought into contact with the lower surface of the interior ceiling material 20 and a portion around the right inner end face 24A, and the upper end of the second short side wall 45B of the vehicle interior lighting device 30 is brought into contact with the left inner end face 26A of the mounting hole 22. At this time, the inclined portion 48C of each of the hooks 48 of the vehicle interior lighting device 30 is brought into contact with the connecting portion 26C of the mounting hole 22.

Subsequently, when the assembling worker pushes the vehicle interior lighting device 30 so as to slide rightward while pushing the left-side lower surface of the vehicle interior lighting device 30 upward, the vehicle interior lighting device 30 goes through the state shown in FIG. 7B, then becomes the state shown in FIG. 7C, and the vehicle interior lighting device 30 is assembled to the interior ceiling material 20 as shown in FIG. 7D. In this process, the inclined portion 48C of each of the hooks 48 of the vehicle interior lighting device 30 guides the horizontal portion 48B of the hook 48 to an assembled location (a predetermined location on the upper surface of the interior ceiling material 20). In this process, the curved portion 49B of each of the ribs 49 of the vehicle interior lighting device 30 guides the contact portion 49A of the rib 49 to be placed at a location at which the contact portion 49A of the rib 49 contacts with the left inner end face 26A of the mounting hole 22 while contacting with the left inner end face 26A of the mounting hole 22 to slightly elastically deform. Thus, the vehicle interior lighting device 30 is smoothly assembled to the interior ceiling material 20. In the assembled state, the frame portion 42 of the vehicle interior lighting device 30 is disposed in a state of being in contact with the lower surface of the periphery of the mounting hole 22 of the interior ceiling material 20 all around.

Operation and Advantageous Effects of Embodiment

Next, the operation and advantageous effects of the present embodiment will be described.

As shown in FIG. 7D, the first sandwiching portion 50 provided in the housing 40 includes the first short side wall 45A facing the right inner end face 24A of the mounting hole 22 and sandwiches the first part 20A located across the first through portion 24 from the second through portion 26 in the interior ceiling material 20. Each of the second sandwiching portions 52 provided in the housing 40 includes the upright portion 48A facing an associated one of the connecting portions 26C of the mounting hole 22 and sandwiches the second part 20B located across the connecting portion 26C from the second through portion 26 in the interior ceiling material 20. With such a structure, the interior ceiling material 20 can be sandwiched by the first sandwiching portion 50 and the second sandwiching portions 52 by sliding the vehicle interior lighting device 30. The vehicle interior lighting device 30 is able to be assembled to the interior ceiling material 20 by using the three sandwiching portions. With such a slide assembling structure, a structure for assembling the vehicle interior lighting device 30 to the interior ceiling material 20 is simplified.

In the present embodiment, one (more specifically, the lower one) of component parts sandwiching the interior ceiling material 20 in the first sandwiching portion 50 and one (more specifically, the lower one) of the component parts sandwiching the interior ceiling material 20 in each second sandwiching portion 52 are made up of the component of the frame portion 42 of the housing 40. Therefore, a structure for assembling the vehicle interior lighting device 30 to the interior ceiling material 20 is effectively simplified.

In the present embodiment, the support wall 46 that supports the connector housing 32B makes up the one (more specifically, the upper one) of the component parts sandwiching the interior ceiling material 20 in the first sandwiching portion 50. In this way, when the support wall 46 that supports the connector housing 32B is also used as the component part of the first sandwiching portion 50, a structure for assembling the vehicle interior lighting device 30 to the interior ceiling material 20 is further effectively simplified.

As described above, with the assembling structure 10 for a vehicle interior lighting device according to the present embodiment, a structure for assembling the vehicle interior lighting device 30 to the interior ceiling material 20 is simplified.

Supplemental Description of Embodiment

The assembling structure for a vehicle interior lighting device according to the aspect of the disclosure may be applied to structures other than the above embodiment, such as a structure of assembling a courtesy lamp to a door trim of a vehicle, a structure of assembling a vanity lamp to a sun visor of a vehicle, and a structure of assembling a luggage lamp to a side trim of a luggage room of a vehicle. In other words, in the above embodiment, the interior material is the interior ceiling material 20; however, the interior material to be applied to the assembling structure for a vehicle interior lighting device according to the aspect of the disclosure may be an interior material other than the interior ceiling material 20, such as a door trim of a vehicle, a sun visor of a vehicle, and a side trim of a luggage room of a vehicle. Examples of the vehicle interior lighting device include lighting devices to be applied as the courtesy lamp, the vanity lamp, and the luggage lamp.

In the above embodiment, part of the component parts of the first sandwiching portion 50 and part of the component parts of each second sandwiching portion 52 are made up of the component of the frame portion 42 of the housing 40; however, one or both of the first sandwiching portion and the second sandwiching portion may be provided separately from the frame portion.

In the above embodiment, the support wall 46 that supports the connector housing 32B is also used as the component part of the first sandwiching portion 50. Instead, the support wall that supports the connector housing may be configured not to be used as the component part of the first sandwiching portion.

In the above embodiment, the connecting portions 26C of the mounting hole 22 shown in FIG. 2 are, for example, slightly inclined toward the left inner end face 26A so as to be away from each other. Instead, the pair of connecting portions 26C may be bent at right angles with respect to the extension direction of the pair of first opposite end faces 24B when viewed in the through direction of the mounting hole 22 and extended so as to be away from each other.

The embodiment and the modifications may be implemented in combination as needed.

Examples of the disclosure are described above; however, the disclosure is not limited to the above-described embodiment and may be, of course, modified into various forms without departing from the scope of the disclosure.

What is claimed is:

1. An assembling structure for a vehicle interior lighting device, the assembling structure comprising:
    an interior material provided so as to face a vehicle cabin and having a through mounting hole, the mounting hole including a first through portion and a second through portion continuous with each other, the second through portion being wider than the first through portion, an inner periphery of the second through portion including a pair of connecting portions extending so as to widen from a pair of inner peripheral ends making up an open end of the first through portion on a side adjacent to the second through portion when viewed in a through direction of the mounting hole;
    a first sandwiching portion provided in a housing of the vehicle interior lighting device to be mounted at a peripheral side of the mounting hole in the interior material, the first sandwiching portion including a first facing portion facing an inner end face opposite from an open side in the first through portion when viewed in the through direction of the mounting hole, the first sandwiching portion sandwiching a first part located across the first through portion from the second through portion in the interior material; and
    a pair of second sandwiching portions provided in the housing, each of the pair of second sandwiching portions including a second facing portion facing an associated one of the pair of connecting portions, each of the pair of second sandwiching portions sandwiching a second part located across the pair of connecting portions from the second through portion in the interior material.

2. The assembling structure according to claim 1, wherein:
    the housing includes a frame portion formed in a frame shape as a component to be disposed adjacent to the vehicle cabin and having an opening extending through in the through direction of the mounting hole; and
    a first part of the frame portion makes up one of component parts of the first sandwiching portion sandwiching the interior material, and a second part of the frame portion makes up one of component parts of each of the second sandwiching portions sandwiching the interior material.

3. The assembling structure according to claim 2, wherein:
    the vehicle interior lighting device includes
        a connector housing in which a connector terminal is accommodated, and
        a support wall provided in the housing and supporting the connector housing; and
    the support wall makes up the other one of the component parts of the first sandwiching portion sandwiching the interior material.

* * * * *